United States Patent
Elbehiery et al.

(10) Patent No.: US 11,987,976 B2
(45) Date of Patent: May 21, 2024

(54) ROTATING BUILDING ASSEMBLY

(71) Applicants: Khaled Elbehiery, Highlands Ranch, CO (US); Hussam Elbehiery, Highlands Ranch, CO (US)

(72) Inventors: Khaled Elbehiery, Highlands Ranch, CO (US); Hussam Elbehiery, Highlands Ranch, CO (US)

(*) Notice: Subject to any disclaimer, the term of this patent is extended or adjusted under 35 U.S.C. 154(b) by 296 days.

(21) Appl. No.: 17/523,275

(22) Filed: Nov. 10, 2021

(65) Prior Publication Data

US 2023/0143610 A1    May 11, 2023

(51) Int. Cl.
| | |
|---|---|
| *E04B 1/346* | (2006.01) |
| *E02D 27/32* | (2006.01) |
| *H02S 20/32* | (2014.01) |

(52) U.S. Cl.
CPC ............ *E04B 1/3465* (2013.01); *E02D 27/32* (2013.01); *H02S 20/32* (2014.12)

(58) Field of Classification Search
CPC .... E04B 1/346; E04B 1/3465; E04B 1/34366; E04B 1/34352; H02S 20/30; H02S 20/32; E02D 27/32; B65G 1/045; E04H 3/04
USPC ............................................................ 52/65
See application file for complete search history.

(56) References Cited

U.S. PATENT DOCUMENTS

| | | | | |
|---|---|---|---|---|
| 968,336 | A * | 8/1910 | Fechtig .................. | E04B 1/346 52/234 |
| 1,353,798 | A * | 9/1920 | Stevens ................ | E04B 1/3465 472/136 |
| 1,798,810 | A * | 3/1931 | Rice ...................... | E04B 1/3465 52/65 |
| 2,927,599 | A * | 3/1960 | Stetson ................... | E03C 1/122 52/234 |
| 3,093,869 | A * | 6/1963 | Ranney ................. | E04B 1/3465 52/185 |
| 3,126,868 | A * | 3/1964 | Ishibashi ................ | A01K 31/17 119/438 |
| 3,388,513 | A * | 6/1968 | Bauer ..................... | E04B 1/346 D25/5 |
| 3,491,496 | A * | 1/1970 | Johnston ................ | E04B 1/346 248/188.4 |
| 3,492,767 | A | 2/1970 | Pincus | |
| 3,554,391 | A * | 1/1971 | Goodell ................. | B65G 1/045 414/331.05 |
| 3,645,052 | A | 2/1972 | Hanna | |

(Continued)

FOREIGN PATENT DOCUMENTS

WO    WO02092928    11/2002

*Primary Examiner* — Kyle J. Walraed-Sullivan (57) ABSTRACT

A rotating building assembly includes a foundation housing that has a lower section and an upper section. A drive unit is positioned in the foundation housing to rotate the foundation housing. A structure is provided which has hub and a plurality of wings each extending away from the hub. The hub is mounted to the foundation housing such that the structure rotates with the foundation housing when the drive unit is turned on. A plurality of solar panels is each coupled to a roof of a respective one of the hub and the wings. Each of the solar panels is in communication with the drive unit and the drive unit analyzes the angle of the solar panels with respect to the sun. Furthermore, the drive unit rotates the foundation housing a calculated degree of rotation to facilitate the solar panels to operate at maximum efficiency.

10 Claims, 7 Drawing Sheets

(56) References Cited

U.S. PATENT DOCUMENTS

| | | | | |
|---|---|---|---|---|
| 3,815,298 A * | 6/1974 | Pope | ............... | E04B 1/346 52/65 |
| 3,855,755 A * | 12/1974 | Burdick | ............... | E04B 1/346 52/65 |
| 3,905,166 A * | 9/1975 | Kaiser | ............... | E04B 1/3465 52/73 |
| 4,352,256 A * | 10/1982 | Kranz | ............... | A01G 9/14 47/17 |
| 4,594,044 A * | 6/1986 | Soot | ............... | E04H 6/282 414/263 |
| 4,599,829 A | 7/1986 | DiMartino, Sr. | | |
| 4,694,620 A * | 9/1987 | Pope | ............... | E04B 1/346 52/65 |
| 4,805,738 A * | 2/1989 | Vayda | ............... | B65G 1/1378 186/36 |
| 4,850,160 A * | 7/1989 | Mullin, Jr. | ............... | E04H 6/00 52/174 |
| 4,969,300 A * | 11/1990 | Pope | ............... | E04B 1/346 52/65 |
| 4,979,869 A * | 12/1990 | Mullin, Jr. | ............... | E04H 6/00 414/807 |
| 5,016,736 A * | 5/1991 | Vayda | ............... | E04B 1/346 414/233 |
| 5,113,974 A * | 5/1992 | Vayda | ............... | B65G 1/045 186/36 |
| 5,896,709 A * | 4/1999 | Pope | ............... | E04B 7/028 52/460 |
| 5,979,120 A * | 11/1999 | Hollstedt | ............... | B62H 3/00 52/DIG. 14 |
| 6,155,003 A * | 12/2000 | Smith | ............... | E04B 1/346 52/65 |
| 6,983,567 B2 | 1/2006 | Ciotti | | |
| D596,313 S | 7/2009 | Perrine | | |
| 8,474,194 B2 | 7/2013 | Tiramani | | |
| 9,506,241 B1 * | 11/2016 | Kuo | ............... | B61H 9/02 |
| 11,072,939 B2 * | 7/2021 | Dautaj | ............... | E04H 12/182 |
| 2002/0045383 A1 * | 4/2002 | Johnstone, III | ............... | E04B 1/3465 439/534 |
| 2002/0129564 A1 * | 9/2002 | Park | ............... | E03C 1/00 52/64 |
| 2006/0201071 A1 * | 9/2006 | Johnstone, III | ............... | E04B 1/3465 52/65 |
| 2006/0230690 A1 * | 10/2006 | Dunick | ............... | E04B 1/3465 52/64 |
| 2006/0230691 A1 * | 10/2006 | Fisher | ............... | E04B 1/346 52/65 |
| 2009/0205264 A1 * | 8/2009 | Fisher | ............... | F03D 13/20 52/173.3 |
| 2009/0266301 A1 * | 10/2009 | Oliver | ............... | E04B 1/346 119/14.04 |
| 2010/0126080 A1 * | 5/2010 | Cooper | ............... | E04B 1/346 52/65 |
| 2013/0263527 A1 * | 10/2013 | Barrett | ............... | E04B 1/343 52/79.1 |
| 2014/0000188 A1 * | 1/2014 | Vayda | ............... | E04H 1/1233 52/175 |
| 2017/0328054 A1 * | 11/2017 | Bakken | ............... | E04H 1/005 |
| 2018/0142467 A1 * | 5/2018 | Ono | ............... | E04H 1/1272 |
| 2018/0294769 A1 * | 10/2018 | Stoger | ............... | H02S 20/30 |
| 2019/0323255 A1 * | 10/2019 | Henderson | ............... | E04H 9/028 |
| 2020/0032504 A1 * | 1/2020 | Song | ............... | H01L 31/04 |

\* cited by examiner

ROTATING BUILDING ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to building devices and more particularly pertains to a new building device for continually positioning solar panels at an optimum angle for maximum efficiency. The device includes a foundation housing, a drive unit integrated into the foundation housing and a structure that is mounted to the foundation housing. The drive unit rotates the foundation housing and the foundation housing rotates the structure. In this way solar panels on a roof of the structure can be continually positioned at the optimum angle for maximum efficiency.

(2) Description of Related Art Including Information Disclosed Under 37 CFR 1.97 and 1.98

The prior art relates to building devices including a disk shaped building that is positioned on a rotatable foundation thereby facilitating the disk shaped building to be rotated. The prior art discloses a variety of prefabricated buildings that can be quickly erected or collapsed. The prior art discloses a prefabricated structure that has a conical shape. The prior art discloses a rotatable structure that comprises a plurality of stacked disks that are independently rotatable with respect to each other.

BRIEF SUMMARY OF THE INVENTION

An embodiment of the disclosure meets the needs presented above by generally comprising a foundation housing that has a lower section and an upper section. A drive unit is positioned in the foundation housing to rotate the foundation housing. A structure is provided which has hub and a plurality of wings each extending away from the hub. The hub is mounted to the foundation housing such that the structure rotates with the foundation housing when the drive unit is turned on. A plurality of solar panels is each coupled to a roof of a respective one of the hub and the wings. Each of the solar panels is in communication with the drive unit and the drive unit analyzes the angle of the solar panels with respect to the sun. Furthermore, the drive unit rotates the foundation housing a calculated degree of rotation to facilitate the solar panels to operate at maximum efficiency.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

With reference now to the drawings, and in particular to FIGS. 1 through 8 thereof, a new building device embodying the principles and concepts of an embodiment of the disclosure and generally designated by the reference numeral 10 will be described.

As best illustrated in FIGS. 1 through 8, the rotating building assembly 10 generally comprises a foundation housing 12 that has a lower section 14 and an upper section 16. The upper section 16 has a bottom wall 18 and an outer wall 20 extending away from the bottom wall 18, and the outer wall 20 is continuously arcuate about a center point of the bottom wall 18 such that the upper section 16 has a cylindrical shape. The foundation housing 12 may be sank into the ground in a manner that facilitates the foundation housing 12 to be rotated. Conversely, the foundation housing 12 may be positioned above ground in a manner that facilitates the foundation housing 12 to be rotated.

The outer wall 20 has an inwardly facing surface 22 and a distal edge 24 with respect to the bottom wall 18. The inwardly facing surface 22 has a plurality of guide teeth 26 extending away from the inwardly facing surface 22, and the guide teeth 26 extend between the bottom wall 18 and the distal edge 24 of the outer wall 20. Furthermore, the guide teeth 26 are evenly spaced apart from each other and are distributed around a full circumference of the inwardly facing surface 22. The lower section 14 has a basal wall 28 and an exterior wall 30 extending away from the basal wall 28. The exterior wall 30 is integrated into the bottom wall 18 of the upper section 16 and the basal wall 28 is oriented coplanar with the bottom wall 18. The basal wall 28 has a diameter that is less than the diameter of the bottom wall 18.

A drive unit 32 is positioned in the foundation housing 12 and the drive unit 32 rotates the foundation housing 12 in a first direction or a second direction when the drive unit 32 is turned on. The drive unit 32 has a vertical axis of rotation and the drive unit 32 has a conduit 34 which is integrated into the drive unit 32. Utility lines 36 are extended through the conduit 34 thereby facilitating the drive unit 32 to rotate around the utility lines 36 when the drive unit 32 is turned on. The utility lines 36 may include electrical lines, water lines and sewer lines, and each of the utility lines 36 is comprised of a flexible material.

The drive unit 32 comprises a motor 38 that is positioned within the lower section 14 of the foundation housing 12, and the motor 38 rotates in a first direction or a second direction. The motor 38 may comprise an electric motor or the like and the motor 38 may be electrically coupled to a municipal electrical grid or other source of electrical power. The motor 38 has an output shaft 40 and the output shaft 40 extends through the bottom wall 18 of the upper section 16 of the foundation housing 12 such that a distal end of the output shaft 40 is positioned within the upper section 16. Furthermore, the motor 38 is mechanically discrete from the lower section 14 such that the motor 38 can freely rotate in the lower section 14.

The drive unit 32 includes a drive gear 42 which is positioned in the upper section 16 of the foundation housing 12. The drive gear 42 has an inside surface 44 and an outside surface 46, and the outside surface 46 has a plurality of drive teeth 48 extending away from the outside surface 46. The plurality of drive teeth 48 are evenly spaced apart from each other and are distributed around a full circumference of the outside surface 46. The drive gear 42 is in communication with the output shaft 40 of the motor 38 such that the motor 38 rotates the drive gear 42 when the motor 38 is turned on. Moreover, the drive gear 42 is oriented in the foundation housing 12 such that the drive gear 42 defines a concentric circle with respect to the outer wall 20 of the upper section 16 having the drive teeth 48 facing the guide teeth 26. The inside surface 44 defines a closed ring which defines the conduit 34 through which the utility lines 36 are extended. Additionally, the drive gear 42 rotates about an axis extending through the basal wall 28 of the lower section 14 and the bottom wall 18 of the upper section 16.

The drive unit 32 includes a plurality of planetary gears 50 which each has an outer surface 52, and the outer surface 52 of each of the planetary gears 50 has a plurality of planetary teeth 54 extending away from the outer surface 52. Each of the planetary gears 50 is positioned between the outer wall 20 of the upper section 16 of the foundation housing 12 and the drive gear 42, and each of the planetary teeth 54 engages the drive teeth 48 and the guide teeth 26. The drive gear 42 rotates each of the planetary gears 50 when the motor 38 is turned on and each of the planetary gears 50 rotates the outer wall 20 of the upper section 16 when the motor 38 is turned on thereby facilitating the foundation housing 12 to be rotated. The drive unit 32 includes a drive control circuit 56 that is integrated into the foundation housing 12 and the drive control circuit 56 is electrically coupled to the motor 38.

The foundation housing 12 includes rotation sensors 58 that are distributed around the outer wall 20 of the upper section 16 of the foundation housing 12. Each of the rotation sensors 58 is electrically coupled to the drive control circuit 56 and the rotation sensors 58 sense a degree of rotation of the outer wall 20 of the upper section 16. Moreover, the drive control circuit 56 analyzes rotation data from the rotation sensors 58. In this way the drive control circuit 56 can turn off the motor 38 when the drive control circuit 56 determines the outer wall 20 has been rotated around 180.0 degrees of a circle. Additionally, the drive control circuit 56 controls the degree of rotation when the motor 38 is rotating in either the first direction or the second direction. Each of the rotation sensors 58 may be an electronic sensor that senses a corresponding magnet, for example, or other type of electronic sensor that can determine how far the foundation housing 12 has been rotated.

A structure 60 is included which has hub 62 and a plurality of wings 64 each extending away from the hub 62. The hub 62 and each of the wings 64 define respective rooms of an occupancy for housing 12 people. Moreover, the hub 62 may define a utility room into which each of the utility lines 36 extends for connecting the entire structure 60 to the utility lines 36. The hub 62 is mounted to the foundation housing 12 such that the structure 60 rotates with the foundation housing 12 when the drive unit 32 is turned on. Additionally, the hub 62 and each of the wings 64 has a roof 66, and the roof 66 may be a pitched roof that is commonly employed on houses. The hub 62 and each of the wings 64 may have internal and external structural features that are common to house construction, including but not being limited to, interior doors, windows, siding, flooring and wall treatments. As is most clearly shown in FIG. 4, the hub 62 may have a floor 68 which is positioned on top of the foundation housing 12 and the distal edge 24 of the outer wall 20 of the foundation housing 12 may engage a floor 70 of each of the wings 64.

A plurality of solar panels 72 is provided and each of the solar panels 72 is coupled to the roof 66 of a respective one of the hub 62 and the wings 64 such that each of the solar panels 72 is exposed to sunlight. Each of the solar panels 72 is in communication with the drive unit 32. In this way the drive unit 32 can analyze the angle of the solar panels 72 with respect to the sun. The drive unit 32 rotates the foundation housing 12 a calculated degree of rotation to facilitate the solar panels 72 to operate at maximum efficiency. Each of the solar panels 72 is electrically coupled to the drive control circuit 56 and the drive control circuit 56 analyzes an output of the solar panels 72. The drive control circuit 56 calculates the angle of rotation to rotate the foundation housing 12 for positioning the solar panels 72 at a predetermined position to facilitate maximum efficiency.

Figure 1:
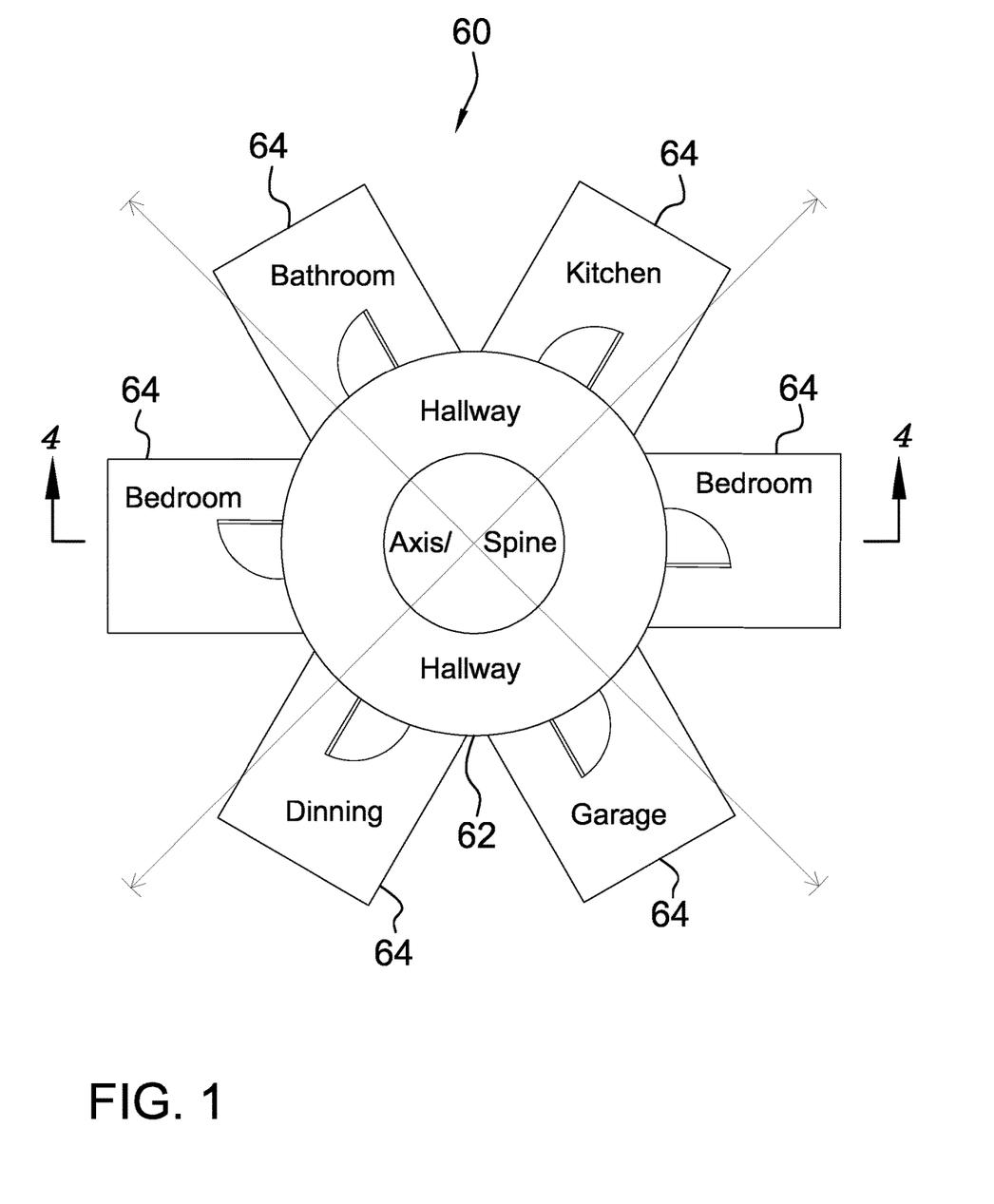
FIG. 1 is a schematic view of a rotating building assembly according to an embodiment of the disclosure.
Figure 2:
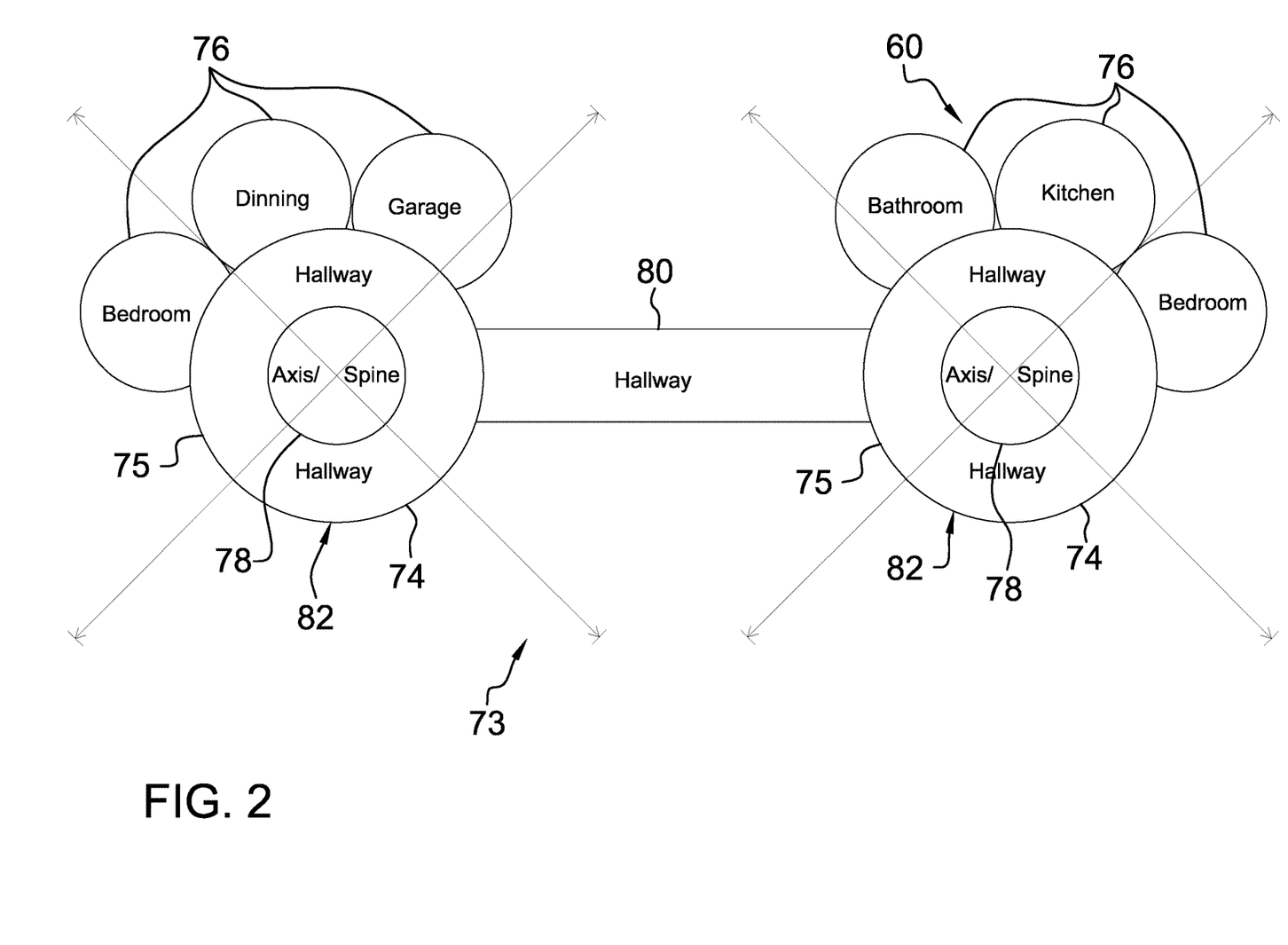
FIG. 2 is a schematic view of an alternative embodiment of the disclosure.
Figure 3:
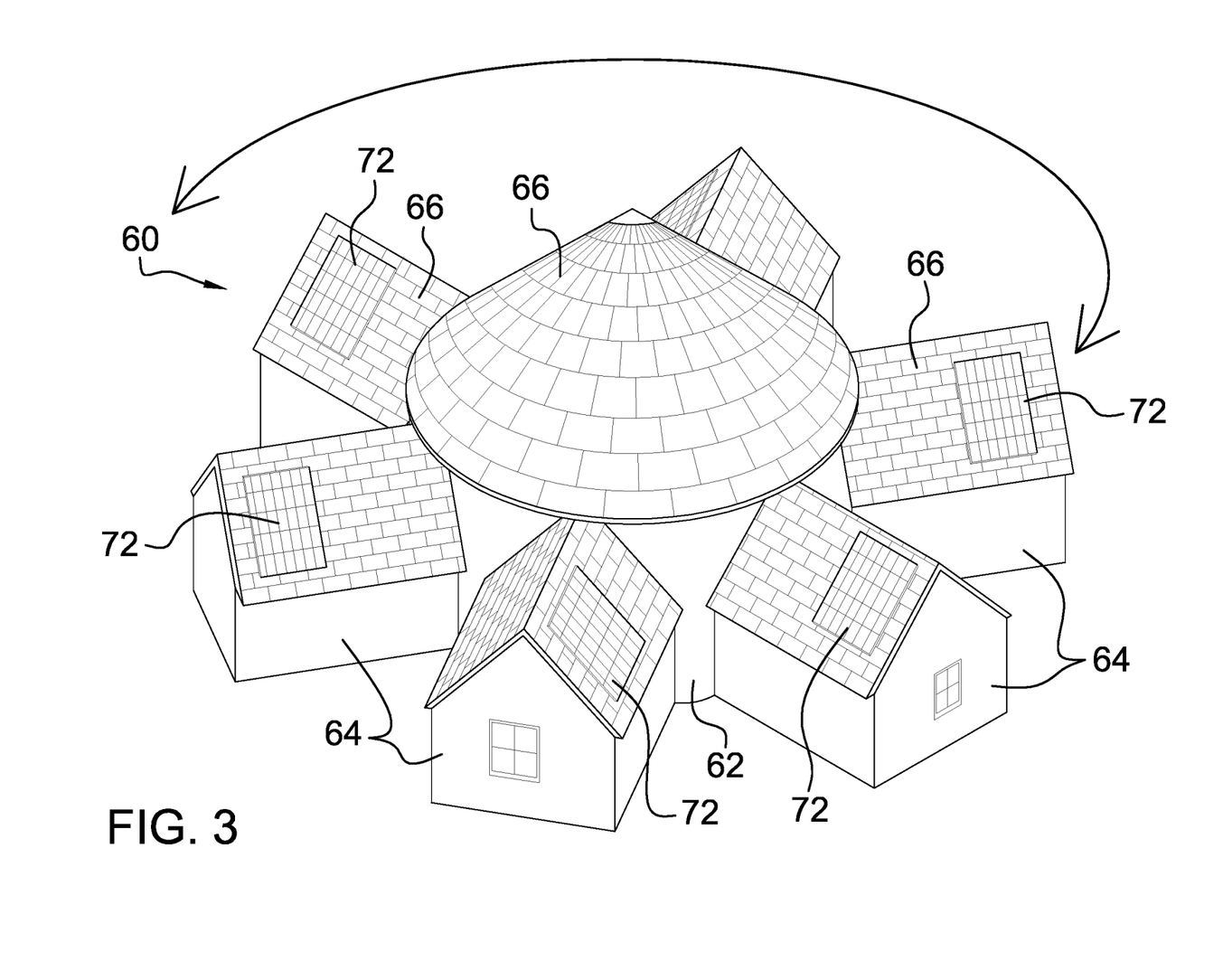
FIG. 3 is a top perspective view of an embodiment of the disclosure.
Figure 4:
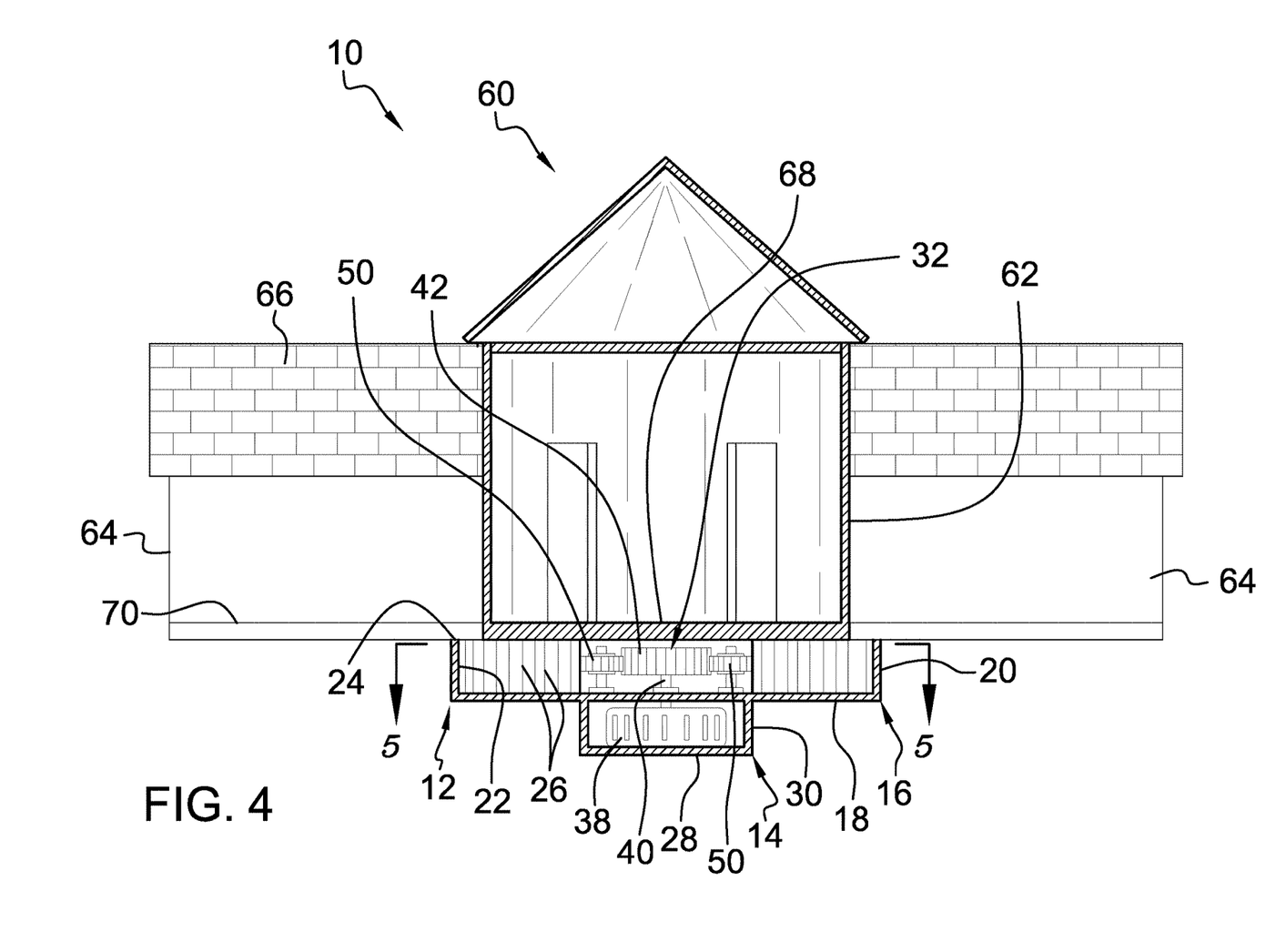
FIG. 4 is a front cut-away view of an embodiment of the disclosure.
Figure 5:
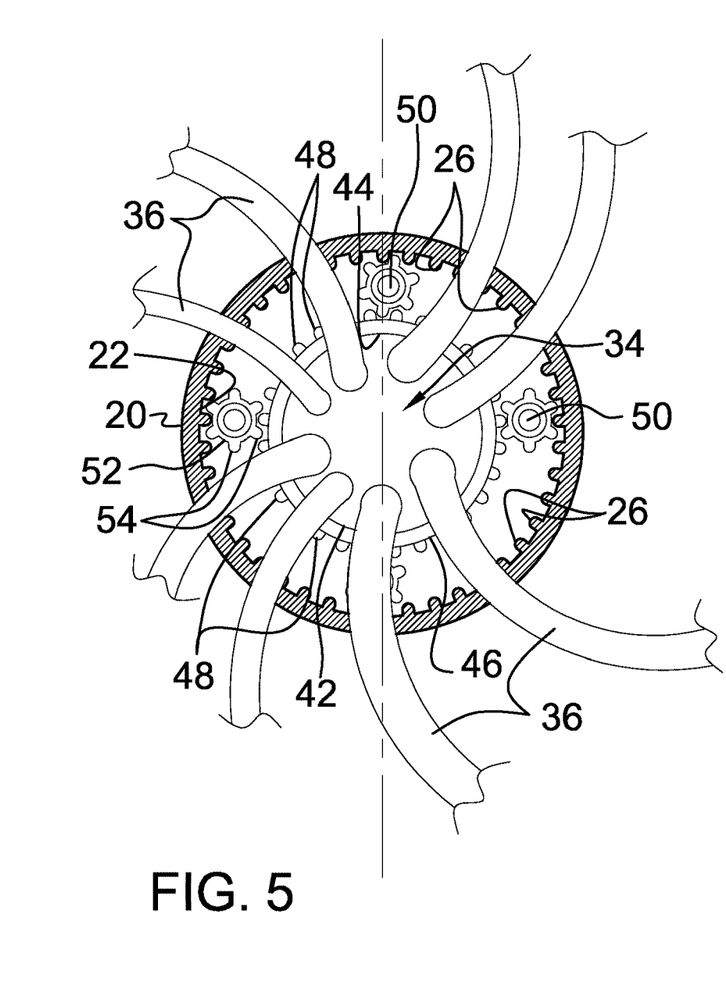
FIG. 5 is a cross sectional view taken along line 5-5 of FIG. 4 of an embodiment of the disclosure.
Figure 6:
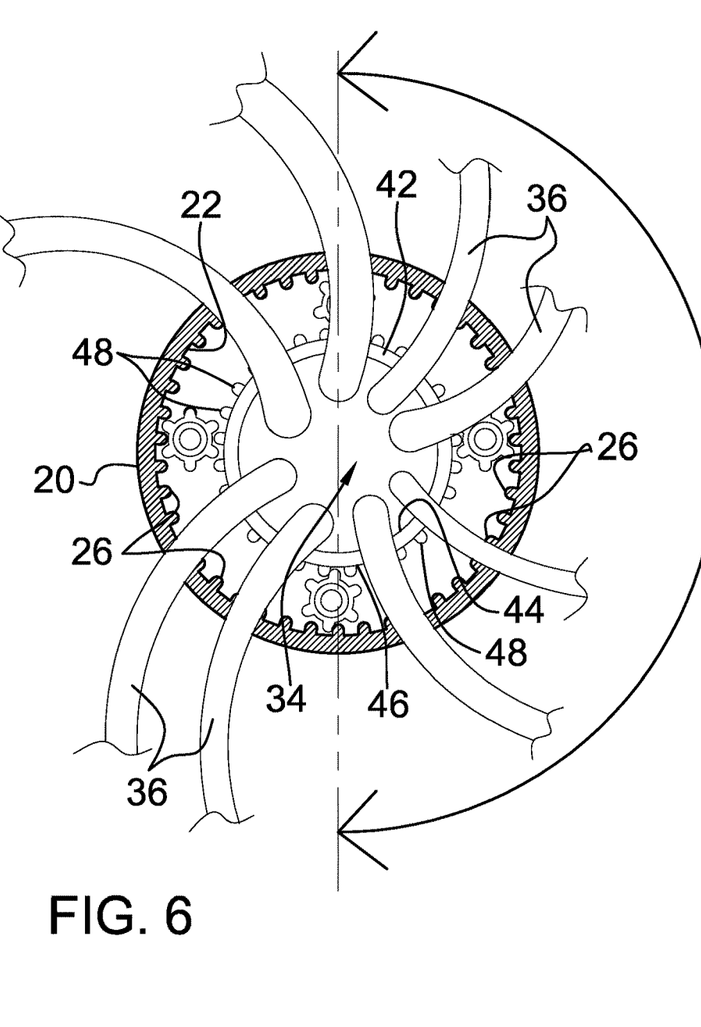
FIG. 6 is a cross sectional view taken along line 5-5 of an embodiment of the disclosure showing a drive unit having been rotated 180.0 degrees.
Figure 7:
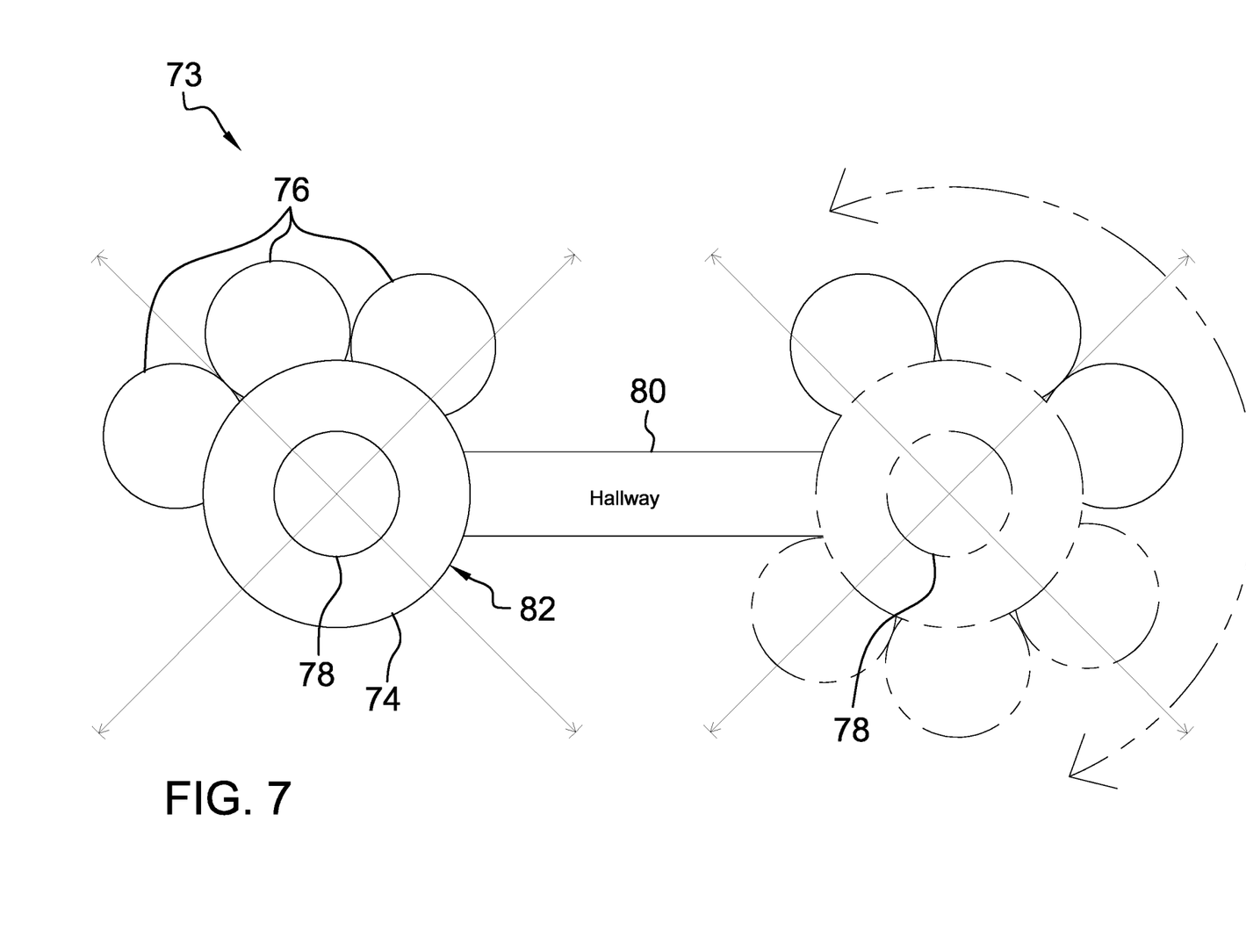
FIG. 7 is a perspective view of an alternative embodiment of the disclosure.
Figure 8:
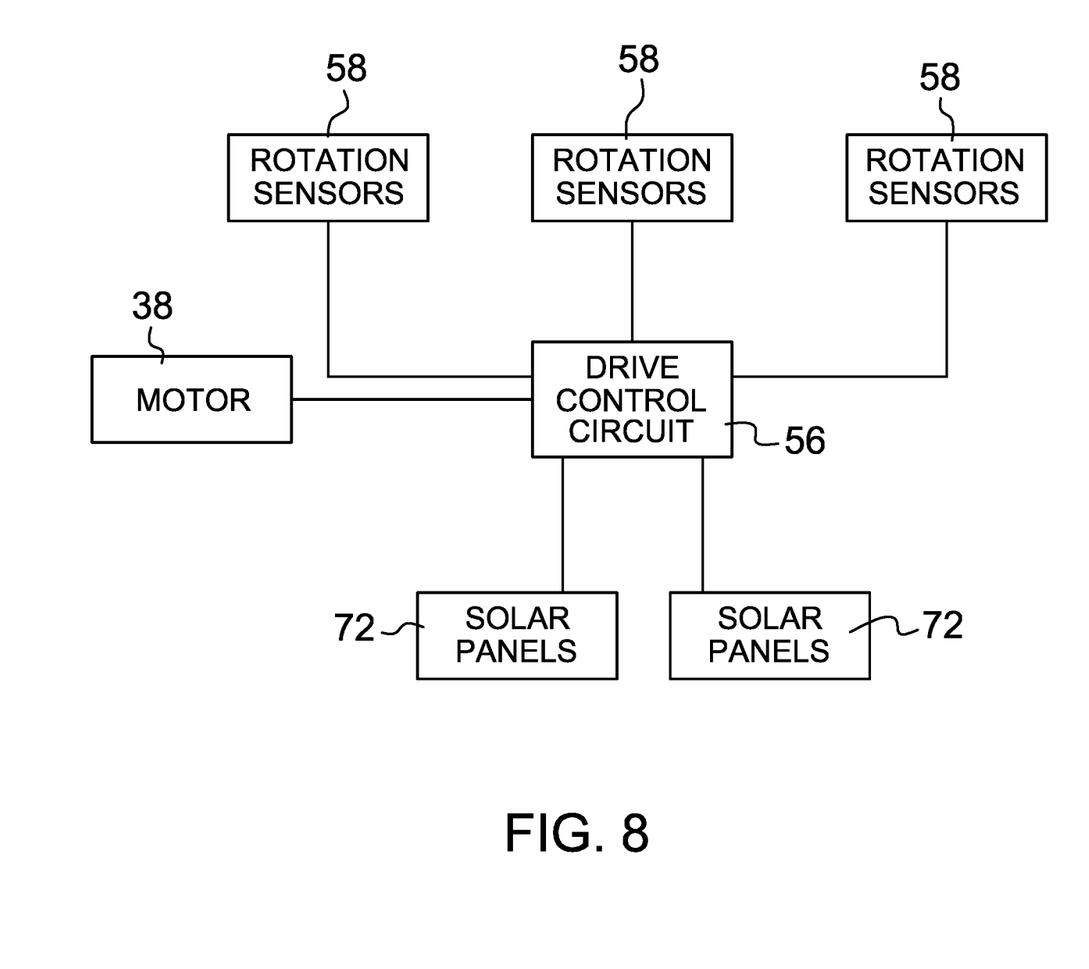
FIG. 8 is a schematic view of a drive unit of an embodiment of the disclosure.

In an alternative embodiment 73 as is most clearly shown in FIGS. 2 and 7, the structure 60 includes a pair of hubs 74 and a pair of sets of lobes 76, and each of the sets of lobes 76 extends away from a respective one of the hubs 74. Each of the hubs 74 is positioned on a respective one of a pair of the foundation units 75 such that each of the hubs 74 is rotated by a respective one of a pair of the drive units 78. The structure 60 includes a hallway 80 extending between each of the hubs 74 to facilitate people to walk between the hubs 74. Each of the hubs 74 has a rotational section 82 that is free of wings 64 and the hallway 80 intersects the rotational section 82 on each of the hubs 74. In this way the hubs 74 can freely rotate on the hallway 80 without having the wings 64 strike the hallway 80.

In use, the drive control circuit 56 analyzes the output of each of the solar panels 72 during daylight hours. Additionally, the drive control circuit 56 actuates the drive unit 32 to rotate the foundation housing 12 in either the first direction or the second direction. In this way the solar panels 72 are positioned to operate at maximum efficiency during each hour of sunlight. Thus, the structure 60 can rely as little as possible on municipal electrical service to supply electrical power to the structure 60. Additionally, the drive unit 32 has a rotational speed that is sufficiently slow to inhibit fixtures in the structure 60, such as furniture or wall hangings, from being disturbed when the structure 60 is rotated. In this way the rotation of the structure 60 has a minimal impact on the day to day activities of the occupants of the structure 60.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. A rotating building assembly for continually positioning roof mounted solar panels at an optimum angle for capturing sunlight, said rotating building assembly comprising:
a foundation housing having a lower section and an upper section;
a drive unit being positioned in said foundation housing, said drive unit rotating said foundation housing in a first direction or a second direction when said drive unit is turned on, said drive unit having a vertical axis of rotation, said drive unit having a conduit being integrated into said drive unit, said conduit having utility lines being extended through said conduit thereby facilitating said drive unit to rotate around said utility lines when said drive unit, is turned on;
a structure having hub and a plurality of wings each extending away from said hub wherein said hub and each of said wings are configured to define respective rooms of an occupancy for housing people, said hub being mounted to said foundation housing such that said structure rotates with said foundation housing when said drive unit is turned on, said huh and each of said wings having a roof;
a plurality of solar panels, each of said solar panels being coupled to said roof of a respective one of said hub and said wings wherein each of said solar panels is configured to be exposed to sunlight, each of said solar panels being in communication with said drive unit wherein said drive unit is configured to analyze the angle of said solar panels with respect to the sun, said drive unit rotating said foundation housing a calculated degree of rotation to facilitate said solar panels to operate;
wherein said upper section has a bottom wall and an outer wall extending away from said bottom wall, said outer wall being continuously arcuate about a center point of said bottom wall such that said upper section has a cylindrical shape, said outer wall having an inwardly facing surface and a distal edge with respect to said bottom wall, said inwardly facing surface having a plurality of guide teeth extending away from said inwardly facing surface, said guide teeth extending between said bottom wall and said distal edge of said outer wall, said guide teeth being evenly spaced apart from each other and being distributed around a full circumference of said inwardly facing surface; and
wherein said lower section has a basal wall and an exterior wall extending away from said basal wall, said exterior will being integrated into said bottom wall of said upper section having said basal wall being oriented coplanar with said bottom wall.

2. The rotating building assembly according to claim 1, wherein said drive unit comprises a motor being positioned within said lower section of said foundation housing, said motor rotating in a first direction or a second direction, said motor having an output shaft, said output shaft extending through said bottom wall of said upper section of said foundation housing such that a distal end of said output shaft is positioned within said upper section, said motor being mechanically discrete from said lower section such that said motor can freely rotate in said lower section.

3. The rotating building assembly according to claim 2, wherein said drive unit includes a drive gear being positioned in said upper section of said foundation housing, said drive gear having an inside surface and an outside surface, said outside surface having a plurality of drive teeth extending away from said outside surface, said plurality of drive teeth being evenly spaced apart from each other and being distributed around a full circumference of said outside surface, said drive gear being in communication with said output shaft of said motor such that said motor rotates said drive gear when said motor is turned on.

4. The rotating building assembly according to claim 3, wherein said drive gear is oriented in said foundation housing to define a concentric circle with respect to said outer wan of said upper section having said drive teeth facing said guide teeth, said inside surface defining a closed ring which defines said conduit through which said utility lines are extended, said drive gear rotating about an axis extending through said basal wall of said lower section and said bottom wall of said upper section.

5. The rotating building assembly according to claim 3, wherein said drive unit includes a plurality of planetary gears, each of said planetary gears having an outer surface, said outer surface of each of said planetary gears having a plurality of planetary teeth extending away from said outer surface, each of said planetary gears being positioned between said outer wall of said upper section of said foundation housing and said drive gear, each of said planetary teeth engaging said drive teeth and said guide teeth, said drive gear rotating each of said planetary gears when said motor is turned on, each of said planetary gears rotating said outer wall of said upper section when said motor is turned on thereby facilitating, said foundation housing to be rotated.

6. The rotating building assembly according to claim 2, wherein:
   said drive unit includes a drive control circuit being integrated into said foundation housing, said drive control circuit being electrically coupled to said motor; and
   said foundation housing includes rotation sensors being distributed around said outer wall of said upper section of said foundation housing, each of said rotation sensors being electrically coupled to said drive control circuit, said rotation sensors sensing a degree of rotation of said outer wall of said upper section, said drive control circuit analyzing rotation data from said rotation sensors, said drive control circuit turning off said motor when said drive control circuit determines said outer wall has been rotated around 180.0 degrees of a circle when said motor is rotating in either said first direction or said second direction.

7. The rotating building assembly according to claim 6, wherein each of said solar panels is electrically coupled to said drive control circuit, said drive control circuit analyzing an output of said solar panels, said drive control circuit calculating the angle of rotation to rotate said foundation housing for positioning said solar panels at a predetermined position to facilitate maximum efficiency.

8. A rotating building assembly for continually positioning roof mounted solar panels at an optimum angle for capturing sunlight, said rotating building assembly comprising:
   a foundation housing having a lower section and an upper section, said upper section having a bottom wall and an outer wall extending away from said bottom wall, said outer wall being continuously arcuate about a center point of said bottom wall such that said upper section has a cylindrical shape, said outer wall having an inwardly facing surface and a distal edge with respect to said bottom wall, said inwardly facing surface having a plurality of guide teeth extending away from said inwardly facing surface, said guide teeth extending between said bottom wall and said distal edge of said outer wall, said guide teeth being evenly spaced apart from each other and being distributed around a full circumference of said inwardly facing surface, said lower section having a basal wall and an exterior wall extending away from said basal wall, said exterior wall being integrated into said bottom wall of said upper section having said basal wall being oriented coplanar with said bottom wall;
   a drive unit being positioned in said foundation housing, said drive unit rotating said foundation housing in a first direction or a second direction when said drive unit is turned on, said drive unit having a vertical axis of rotation, said drive unit having a conduit being integrated into said drive unit, said conduit having utility lines being extended through said conduit thereby facilitating said drive unit to rotate around said utility lines when said drive unit is turned on, said drive unit comprising:
      a motor being positioned within said lower section of said foundation housing, said motor rotating in a first direction or a second direction, said motor having an output shaft, said output shaft extending through said bottom wall of said upper section of said foundation housing such that a distal end of said output shaft is positioned within said upper section, said motor being mechanically discrete from said lower section such that said motor can freely rotate in said lower section;
      a drive gear being positioned in said upper section of said foundation housing, said drive gear having an inside surface and an outside surface, said outside surface having a plurality of drive teeth extending away from said outside surface, said plurality of drive teeth being evenly spaced apart from each other and being distributed around a full circumference of said outside surface, said drive gear being in communication with said output shaft of said motor such that said motor rotates said drive gear when said motor is turned on, said drive gear being oriented in said foundation housing to define a concentric circle with respect to said outer wall of said upper section having said drive teeth facing said guide teeth, said inside surface defining a closed ring which defines said conduit through which said utility lines are extended, said drive gear rotating about an axis extending through said basal wall of said lower section and said bottom wall of said upper section; and
      a plurality of planetary gears, each of said planetary gears having an outer surface, said outer surface of each of said planetary gears having a plurality of planetary teeth extending away from said outer surface, each of said planetary gears being positioned between said outer wall of said upper section of said foundation housing and said drive gear, each of said planetary teeth engaging said drive teeth and said guide teeth, said drive gear rotating each of said planetary gears when said motor is turned on, each of said planetary gears rotating said outer wall of said upper section when said motor is turned on thereby facilitating said foundation housing to be rotated;
   a drive control circuit being integrated into said foundation housing, said drive control circuit being electrically coupled to said motor; and
   wherein said foundation housing includes rotation sensors being distributed around said outer wall of said upper section of said foundation housing, each of said rotation sensors being electrically coupled to said drive control circuit, said rotation sensors sensing a degree of rotation of said outer wall of said upper section, said drive control circuit analyzing rotation data from said rotation sensors, said drive control circuit turning off said motor when said drive control circuit determines said outer wall has been rotated around 180.0 degrees of a circle when said motor is rotating in either said first direction or said second direction;
   a structure having hub and a plurality of wings each extending away from said hub wherein said huh and each of said wings are configured to define respective rooms of an occupancy for housing people, said hub being mounted to said foundation housing such that said structure rotates with said foundation housing when said drive unit is turned on, said hub and each of said wings having a roof; and
   a plurality of solar panels, each of said solar panels being coupled to said roof of a respective one of said hub and said wings wherein each of said solar panels is configured to be exposed to sunlight, each of said solar panels being in communication with said drive unit wherein said drive unit is configured to analyze the angle of said solar panels with respect to the sun, said drive unit rotating said foundation housing a calculated degree of rotation to facilitate said solar panels to operate, each of said solar panels being electrically coupled to said drive control circuit, said drive control circuit analyzing an output of said solar panels, said drive control circuit calculating the angle of rotation to rotate said foundation housing for positioning said solar panels at a predetermined position to facilitate maximum efficiency.

9. The rotating building assembly according to claim 8, wherein said structure includes a pair of hubs and a pair of sets of lobes, each of said sets of lobes extending away from a respective one of said hubs, each of said hubs being positioned on a respective one of a pair of said foundation units such that each of said hubs is rotated by a respective one of a pair of said drive units.

10. The rotating building assembly according to claim 9, wherein said structure includes a hallway extending between each of said hubs wherein said hallway is configured to facilitate people to walk between said hubs.

\* \* \* \* \*